(12) United States Patent
Tansey et al.

(10) Patent No.: US 7,592,040 B2
(45) Date of Patent: Sep. 22, 2009

(54) TWO-TONE COLOR EFFECT COATING PROCESS

(75) Inventors: Richard S. Tansey, Avon Lake, OH (US); John C. Reising, North Ridgeville, OH (US); Stacie L. Toothman, Amherst, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 610 days.

(21) Appl. No.: 11/063,810

(22) Filed: Feb. 23, 2005

(65) Prior Publication Data

US 2006/0188652 A1    Aug. 24, 2006

(51) Int. Cl.
  *B05D 5/06*    (2006.01)
  *B05D 1/38*    (2006.01)
  *B05D 3/00*    (2006.01)

(52) U.S. Cl. .................. 427/189; 427/195; 427/258; 427/375; 427/384; 427/385.5

(58) Field of Classification Search .......... 427/180, 427/189, 195, 201–203, 256, 258, 375, 384, 427/385.5
  See application file for complete search history.

(56) References Cited

U.S. PATENT DOCUMENTS

| | | | |
|---|---|---|---|
| 3,888,943 A | 6/1975 | Labana et al. ............... 260/836 |
| 3,919,345 A | 11/1975 | Labana et al. ........... 260/830 R |
| 3,975,456 A | 8/1976 | Labana et al. ............... 260/836 |
| 3,991,133 A | 11/1976 | Siwiec et al. ............... 260/836 |
| 4,092,373 A | 5/1978 | Sieiec et al. ............ 260/830 R |
| 4,374,954 A | 2/1983 | Labana et al. ............... 525/207 |
| 4,681,811 A | 7/1987 | Simpson et al. ............. 428/413 |
| 4,740,384 A * | 4/1988 | Meisner et al. ............. 427/466 |
| 4,801,680 A * | 1/1989 | Geary et al. ................ 528/272 |
| 4,988,793 A | 1/1991 | Barbee et al. ............... 528/272 |
| 5,212,245 A | 5/1993 | Franks et al. ............... 525/223 |
| 5,214,101 A | 5/1993 | Pettit, Jr. et al. ............ 525/176 |
| 5,218,055 A | 6/1993 | Marrion et al. ............. 525/327 |
| 5,229,458 A | 7/1993 | Schimmel et al. ........... 525/108 |
| 5,407,707 A | 4/1995 | Simeone et al. ............. 427/410 |
| 5,472,649 A | 12/1995 | Chang et al. .................. 264/15 |
| 5,536,785 A | 7/1996 | Foukes et al. ............... 525/176 |
| 5,646,228 A | 7/1997 | Gras et al. ..................... 528/45 |

(Continued)

FOREIGN PATENT DOCUMENTS

EP    0307623    3/1989

(Continued)

*Primary Examiner*—William Phillip Fletcher, III
(74) *Attorney, Agent, or Firm*—Robert A. Diaz (57) ABSTRACT

A process for applying a two-tone color effect coating to a substrate including applying an accent powder basecoating composition including film-forming material; reaction product as described herein; flow control agent; and first color effect additive, to a first predetermined portion of a surface of a substrate; at least partially curing the accent basecoating; applying a main liquid or powder basecoating composition having a different color effect additive to a second predetermined portion of the substrate, such that a portion of the accent basecoat is not contacted by the main basecoating composition; at least partially curing the main basecoating composition; applying a topcoating composition over the accent basecoat and main basecoat and curing the resulting composite coating, such that the first portion of the substrate has a different color effect than the second portion of the substrate to provide a two-tone color effect coated substrate.

22 Claims, 1 Drawing Sheet

U.S. PATENT DOCUMENTS

| | | |
|---|---|---|
| 6,093,774 A | 7/2000 | Dumain ........................ 525/207 |
| 6,099,899 A | 8/2000 | Briggs et al. ................. 427/203 |
| 6,376,016 B1 * | 4/2002 | Farquhar et al. ............. 427/258 |
| 6,715,196 B2 | 4/2004 | Reising et al. ................. 29/458 |
| 7,001,943 B2 | 2/2006 | Yuan et al. ................... 524/423 |
| 2005/0084528 A1 | 4/2005 | Williams et al. ............... 428/31 |
| 2005/0158522 A1 | 7/2005 | Lieverz et al. ........... 428/195.1 |
| 2006/0045965 A1 | 3/2006 | Lin ............................. 427/162 |

FOREIGN PATENT DOCUMENTS

| | | |
|---|---|---|
| EP | 0 307 623 B1 * | 12/1991 |
| GB | 2 399 040 A * | 9/2004 |
| WO | WO94/10213 | 5/1994 |
| WO | WO 2005/070562 | 8/2005 |

* cited by examiner

TWO-TONE COLOR EFFECT COATING PROCESS

BACKGROUND OF THE INVENTION

Field of the Invention

The invention relates to simplified two-tone color effect coating processes that are resistant to overspray incompatibility coating defects, such as cratering, chipping and lack of intercoat adhesion.

Today's automobile bodies are treated with multiple layers of coatings that not only enhance the appearance of the automobile, but also provide protection from corrosion, chipping, ultraviolet light, acid rain and other environmental conditions that can deteriorate the coating appearance and underlying car body.

The formulations of these coatings can vary widely. However, a major challenge that faces all automotive manufacturers is how to rapidly apply and cure these coatings with minimal capital investment and floor space, which is valued at a premium in manufacturing plants. Use of powder coatings is desirable because they emit very low amounts of volatile materials to the environment when cured and excess material can be easily recycled.

Two-tone coating of an automobile is a popular consumer option. "Two-tone" color effect or coating means that one portion of the automobile or substrate i coated with a different color or visual effect coating from a second portion of the substrate. For example, an accent coating having a different color or visual effect can be applied across the lower portion of the automobile, generally along the lower about 10 cm to about 25 cm (about 4 to about 10 inches high) of the automobile.

Figure 1:
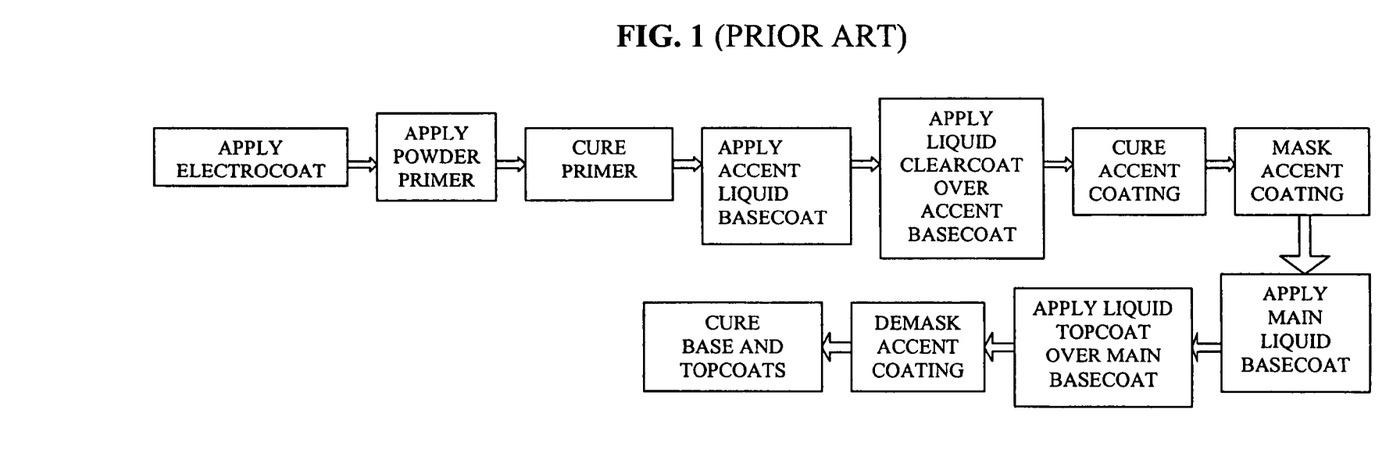
FIG. 1 is a schematic diagram of a prior art two-tone automotive coating process.
Figure 2:
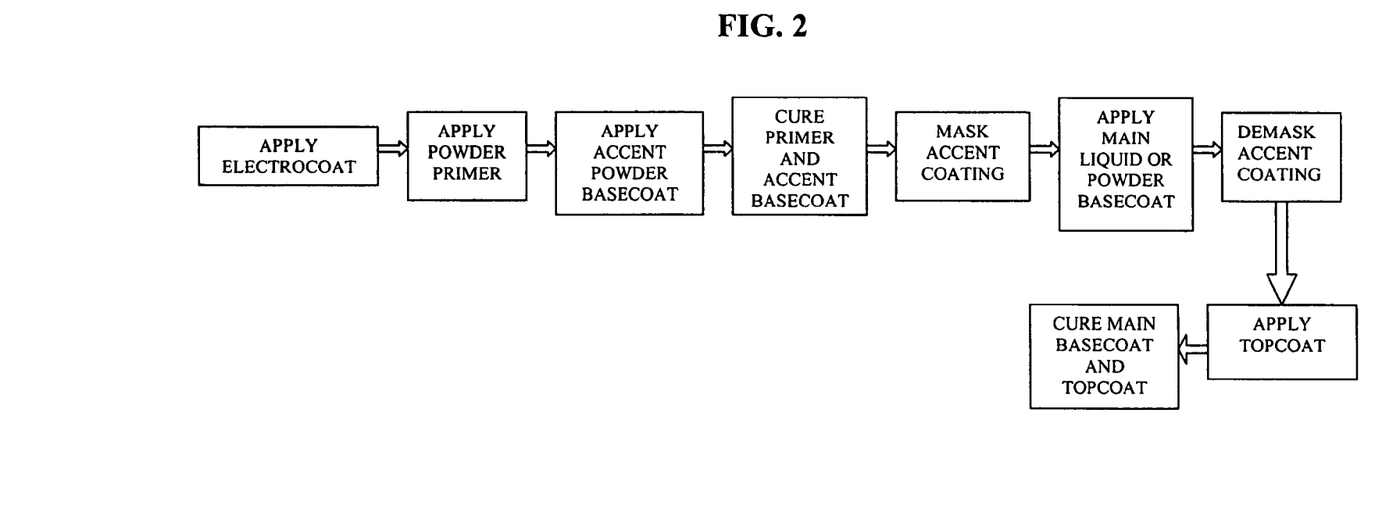
FIG. 2 is a schematic diagram of a two-tone coating process according to the present invention.

A conventional prior art two-tone automobile coating process is shown in FIG. 1. Typically, corrosion-resistant coatings such as electrocoat and/or powder primer are applied to the entire automobile body. An accent liquid basecoat and clearcoat are applied to the lower portion of the automobile body and cured. The accent coating is masked, and main liquid basecoat and topcoat are applied to the remainder of the automobile body. The masking of the accent coating is removed and the entire automobile body is cured.

Despite recent improvements in color-plus-clearcoating systems, there remains a need in the automotive coatings art for coatings that lower VOC of the overall painting process and minimize retrofit expenses for existing automotive coating assembly lines. Also, it is desirable to reduce the number of heating steps in the two-tone coating process to reduce energy and equipment cost and processing time. Such two-tone coatings should be resistant to overspray defects and have good intercoat adhesion.

SUMMARY OF THE INVENTION

In one embodiment, the present invention provides a process for applying a two-tone color effect coating to a substrate, comprising the steps of:
 (a) applying an accent powder basecoating composition to a first predetermined portion of a surface of a substrate to form an accent powder basecoating, the accent powder basecoating composition comprising at least one film-forming material and a first color effect additive;
 (b) at least partially curing the accent powder basecoating to form an accent basecoat;
 (c) applying a main liquid or powder basecoating composition to a second predetermined portion of the surface of the substrate, such that a portion of the accent basecoat is not contacted by the main basecoating composition, wherein the main powder basecoating composition comprises at least one film-forming material and a second color effect additive that is different from the first color effect additive of the accent powder basecoating composition;
 (d) at least partially curing the main basecoating composition to form a main basecoat;
 (e) applying a topcoating composition over the accent basecoat and main basecoat; and
 (f) curing the topcoating composition and any uncured basecoat, such that the first predetermined portion of the surface of the substrate has a different color effect than the second predetermined portion of the surface of the substrate to provide a two-tone color effect coated substrate.

Other than in the operating examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

BRIEF DESCRIPTION OF THE DRAWINGS

The foregoing summary, as well as the following detailed description, will be better understood when read in conjunction with the appended drawings. In the drawings.

DETAILED DESCRIPTION

The present invention relates to environmentally friendly and cost-effective processes of forming two-tone coatings for substrates useful as panels and parts, particularly for automotive applications. The powder accent basecoating can provide good gloss, durability, scratch and humidity resistance and is resistant to overspray incompatibility coating defects, such as cratering, chipping and lack of intercoat adhesion, and is compatible with a wide variety of conventional liquid or powder basecoats and topcoats, providing versatility in the automobile assembly line. The composite coating can be applied directly to metal and/or polymer substrates, eliminating the need for primer coatings. Another advantage of the invention is the ability to produce these panels and parts using a virtually zero VOC basecoat system with high utilization rates.

The process of the present invention provides two-tone color effect coated substrates having an accent coating and a main coating applied over adjacent portions of a substrate, preferably with minimal overlap.

Suitable substrates for coating according to the present process are selected from the group consisting of metallic substrates, polymeric substrates, such as thermoset materials and thermoplastic materials, and combinations thereof.

Useful metal substrates include ferrous metals, non-ferrous metals, and combinations thereof. Suitable ferrous metals include iron, steel, and alloys thereof. Non-limiting examples of useful steel materials include cold rolled steel, zinc coated steels such as hot dip galvanized and electrogalvanized steel, stainless steel, pickled steel, zinc-iron alloy such as GALVANEAL, zinc-aluminum alloys coated over steel such as GALVALUME, and GALFAN, and combinations thereof. It is possible for different portions of the same substrate to be different forms of ferrous metal, for example, for the zinc coating to be applied to only certain portions or one side of the steel substrate. Useful non-ferrous metals include aluminum, zinc, magnesium, and alloys thereof. Combinations or composites of ferrous and non-ferrous metals can, also be used. Preferred metallic substrates are anti-corrosive steels such as the zinc coated steels and the zinc-iron alloy and the zinc-aluminum alloys mentioned above.

Useful thermoset materials include polyesters, epoxides, phenolics, polyurethanes such as reaction injected molding urethane (RIM) thermoset materials and mixtures thereof. Useful thermoplastic materials include thermoplastic polyolefins such as polyethylene and polypropylene, polyamides such as nylon, thermoplastic polyurethanes, thermoplastic polyesters, acrylic polymers, vinyl polymers, polycarbonates, acrylonitrile-butadiene-styrene (ABS) copolymers, ethylene propylene diene monomer (EPDM) rubber, copolymers and mixtures thereof.

Preferably, the substrates are used as components to fabricate automotive vehicles, including but not limited to automobiles, trucks and tractors. The substrates can have any shape, but are preferably in the form of automotive body components such as bodies (frames), hoods, doors, fenders, bumpers and/or trim for automotive vehicles.

The present invention first will be discussed generally in the context of coating a metallic automobile body. One skilled in the art would understand that the process of the present invention also is useful for coating non-automotive metal and/or polymeric components, which will be discussed below.

Before depositing the coatings upon the surface of the metal substrate, it is preferred to remove dirt, oil, or foreign matter from the metal surface by thoroughly cleaning and degreasing the surface. The surface of the metal substrate can be cleaned by physical or chemical means, such as mechanically abrading the surface or cleaning/degreasing with commercially available alkaline or acidic cleaning agents which are well known, to those skilled in the art, such as sodium metasilicate and sodium hydroxide. Non-limiting examples of suitable alkaline cleaning agents include CHEMKLEEN 163 and CHEMKLEEN 177 phosphate cleaners that are commercially available from PPG Industries, Inc. of Pittsburgh, Pa.

Following the cleaning step, the metal substrate is usually rinsed with water preferably deionized water, in order to remove any residue. The metal substrate can optionally be dried using an air knife, by flashing the water off by brief exposure to a high temperature, or by passing the metal between squeegee rolls.

Following the cleaning and optional drying steps, the metal substrate may be optionally pretreated with a thin layer of pretreatment. The advantages of pretreatment include protection of the metallic substrate from corrosion and improvement of adhesion of subsequent coating layers to the substrate. Pretreatments may be chrome, containing or preferably chrome-free. The choice of pretreatment is generally determined by the substrate and environmental considerations. Appropriate pretreatments are well known to those skilled in the art. An example of a suitable chrome pretreatment is Granodine 1415A available from Henkel Surface Technologies, NA. An example of a chrome-free pretreatment is Nupal 456BZ available from PPG Industries, Inc. or CHEMFOS 700 zinc phosphate pretreatment.

The pretreatment solution is applied to the surface of the metal substrate by any conventional application technique, such as spraying, immersion or roll coating in a batch or continuous process. The temperature of the treating solution at application is typically about 10° C. to about 85° C., and preferably about 15° C. to about 40° C. The pH of the preferred treating solution at application generally ranges from about 2.0 to about 9.0, and is preferably about 3 to about 5.

The film coverage of the residue of the pretreatment coating generally ranges from about 0.1 to about 1000 milligrams per square meter ($mgm^2$), and is preferably about 1 to about 400 $mg/^2$.

Hereafter, the term "substrate" shall refer to the cleaned, optionally pretreated, substrate.

Referring now to FIG. 1, the surface of the substrate can be coated with an electrodeposited primer coating prior to application of the composite coating. Suitable electrodepositable coating compositions include conventional anionic or cationic electrodepositable coating compositions, such as epoxy or polyurethane-based coatings discussed in U.S. Pat. Nos. 6,217,674, 5,530,043; 5,760,107; 5,820,987 and 4,933,056, incorporated herein by reference. One skilled in the art would understand that such an electrodepositable coating composition is essentially free of electroconductive pigments, i.e., less than about 5 weight percent, preferably less than about 2 weight percent and more preferably is free of electroconductive pigments, on a basis of total weight of the electrodepositable coating composition, as such electroconductive materials would interfere with the electrodeposition process. Methods of application and suitable coating thicknesses are well known to those skilled in the art and are disclosed in the foregoing references.

To provide added cost savings, in another embodiment the surface of the substrate is essentially free of electrodeposited primer coating prior to application of the composite coating, i.e., the surface of the substrate has less than about 5 percent of its surface area coated with electrodeposited primer and more preferably less than about 2 percent. In another embodiment, the surface of the substrate is free of electrodeposited primer coating prior to application of the composite coating.

An advantage of the composite coating of the present invention is that it can be applied directly to bare metal, eliminating the need for primer coating. Besides the obvious cost savings of eliminating a coating layer and saving energy by eliminating a drying step elimination of electrodeposition of primer coating can significantly reduce plant infrastructure expense. Preferably, the bare metal is cold-rolled steel or galvanized steel.

Alternatively or additionally, the substrate can be coated with a powder primer, such as are disclosed in U.S. Pat. Nos. 4,804,581; 5,212,245 and 5,248,400 (incorporated by reference herein). Another example of a useful powder primer is ENVIROCRON PCV70118 powder primer available from PPG Industries, Inc.

The powder primer can be a conductive weldable powder primer, such as is described in U.S. Pat. No. 6,715,196 (incorporated by reference herein). However, it is preferred that the surface of the substrate is essentially free of conductive weldable primer coating prior to application of the composite coating, i.e., the surface of the substrate has less than about 5 percent of its surface area coated with conductive weldable primer and more preferably less than about 2 percent. More preferably, the surface of the substrate is free of conductive weldable primer coating prior to application of the composite coating As used herein, "conductive weldable primer" or "conductive weldable primer coating" means a conductive, weldable coating that is formed from a composition comprising one or more electroconductive pigments which provide electroconductivity to the weldable coating and one or more binders which adhere the electroconductive pigment to the substrate, such as are disclosed in. U.S. Pat. No. 6,715,196, incorporated by reference herein. Such electroconductive pigments include zinc, iron phosphide, aluminum, iron, graphite, nickel, tungsten and mixtures thereof, such as Stolberger ZINCOLI as ZINCOLI S 620 zinc particles, US Zinc Superfine 7 zinc dust or Ferrophos Microfine grade 2132 iron phosphide from Glenn Springs Holdings of Lexington, Ky. Such a composition comprises a substantial amount of electroconductive pigment, generally greater than about 10 volume percent and usually about 30 to about 60 volume percent on a basis of total volume of electroconductive pigment and binder.

In the process of the present invention, an accent powder basecoat is deposited upon a first predetermined portion of the surface of the substrate. For example, the predetermined portion can be across the lower portion of the automobile body, as discussed above.

The accent powder basecoat is formed from a powder basecoating composition comprising at least one film-forming material. Preferably, the polymeric, film-forming material of the powder basecoating composition is of the thermoset type and comprises: (a) one or more polymers having reactive functional groups and; (b) one or more curing agents selected to react with the functional groups of (a).

At least one of the polymers (a) having reactive functional groups is a thermosettable polyester. The thermosettable polyester can have reactive functional groups selected from the group consisting of hydroxyl, carboxylic acid, epoxy, carbamate, amide, carboxylate and combinations thereof.

Preferably, the thermosettable polyester has carboxylic acid functionality. Monomers for the synthesis of polyester polymers having carboxylic acid functionality suitable for use in the powder coating compositions of the present invention are chosen such that the resulting polyester polymer has a $T_g$ greater than 40° C.

Among the carboxylic acid group-containing polyesters that may be used are those based on a condensation reaction of aliphatic polyols, including cycloaliphatic polyols, with aliphatic and/or aromatic polycarboxylic acids and anhydrides. Examples of suitable aliphatic polyols include 1,2-ethanediol, 1,3-propanediol, 1,4-butanediol, 1,6-hexanediol, neopentyl glycol, cyclohexane dimethanol, trimethylolpropane, and the like. Suitable polycarboxylic acids and anhydrides include succinic acid, adipic acid, azelaic acid, sebacic acid, terephthalic acid, isophthalic acid, tetrahydrophthalic acid, hexahydrophthalic acid, trimellitic acid, and anhydrides of such acids.

The polyol and the acid or anhydride are reacted together with an, excess of acid over alcohol so as to form a polyester which has free carboxylic groups. Preferably, the carboxylic acid group-containing polyester will have an acid number of from about 20 to about 80, more preferably from about 30 to about 75, and will be an amorphous solid at room temperature. The, polyester is further characterized as having a $T_g$ of from about 30° C. to about 85° C., preferably from about 40° C. to about 75° C.

The $T_g$ of a polymer is a measure of the hardness and melt flow of the polymer. The higher the $T_g$, the less the melt flow and the harder the coating. $T_g$ is described in Principles of Polymer Chemistry (1953), Cornell University Press. The $T_g$ can be actually measured or it can be calculated as described by Fox in Bull. Amer. Physics Soc., 1, 3, page 123 (1956). $T_g$, as used herein, refers to actually measured values. For measurement of the $T_g$ of a polymer, differential scanning calorimetry (DSC) can be used (a rate of heating of 10° C. per minute, with $T_g$ taken at the first influxation point).

If the $T_g$ of the polyester is below 30° C., the polymer and a powder coating composition including such a polymer can tend to be sticky and difficult to handle. If the $T_g$ is above 85° C., the melt flow of the polyester is low and the coating may have poor appearance.

Examples of suitable carboxylic acid group-containing polyester polymers are those described in U.S. Pat. No. 4,801, 680 at col. 5, line 65 to col. 7, line 39, hereby incorporated by reference. A preferred carboxylic acid functional polyester is DSM P880, which is available from DSM.

In addition to the thermosettable polyester, the accent powder basecoating composition can further comprise other oligomers or polymers containing functional groups such as hydroxyl, carboxylic acid, epoxy, carbamate, amide and carboxylate functional groups.

The use in powder coatings of acrylic, polyester, polyether and polyurethane oligomers and polymers having hydroxyl functionality is well known in the art. Monomers for the synthesis of such oligomers and polymers are chosen such that the resulting oligomers and polymers have a $T_g$ greater than 40° C. Examples of such oligomers and polymers having hydroxyl functional groups suitable for use in the powder coating compositions of the present invention are those described in U.S. Pat. No. 5,646,228 at column 5, line 1 to column 8, line 7, incorporated by reference herein.

The use in powder coatings of acrylic polymers having carboxylic acid functionality is well known in the art. Monomers for the synthesis of the acrylic polymers having carboxylic acid functionality suitable for use in the powder coating compositions of the present invention are chosen such that the resulting acrylic polymer has a $T_g$ greater than 40° C. Examples of carboxylic acid group containing acrylic polymers are those described in U.S. Pat. No. 5,214,101 at col. 2, line 59 to col. 3, line 23, incorporated by reference herein.

Also useful in powder coating compositions are acrylic, polyester and polyurethane polymers containing carbamate functional groups and epoxy functional groups, such as those well known in the art. Examples of such polymers having carbamate functionality suitable for use in the powder coating compositions of the invention are described in international application WO 94/10213. Examples of polymers having epoxy functionality suitable for use in powder coating compositions are described in U.S. Pat. No. 5,407,707, incorporated by reference herein. Monomers for the synthesis of such polymers for use in the powder coating compositions are chosen such that the resulting polymer has a high $T_g$, that is, a $T_g$ greater than 40° C.

Suitable curing agents for the powder basecoating composition include aminoplasts, blocked polyisocyanates, polyacids, polyepoxides, polyols, polyanhydrides, hydroxyalkylamides, and mixtures thereof.

Blocked isocyanates as curing agents for (OH) and primary and/or secondary amino group containing materials are well known in the art. Examples of blocked isocyanates suitable for use as curing agents in the powder coating compositions of the present invention are those described in U.S. Pat. No. 4,988,793, col. 3, lines 1 to 36, incorporated by reference herein.

Polyepoxides as curing agents for (COOH) functional group containing materials are well known in the art. Examples of polyepoxides suitable for use as curing agents in the powder coating compositions of the present invention are those described in U.S. Pat. No. 4,681,811 at col. 5, lines 33 to 58, incorporated by reference herein.

Polyacids as curing agents for epoxy functional group containing materials are well known in the art. Examples of polyacids suitable for use as curing agents in the powder coating compositions of the present invention are those described in U.S. Pat. No. 4,681,811 at col. 6, line 45 to col. 9, line 54, incorporated by reference herein.

Polyols, that is, material having an average of two or more hydroxyl groups per molecule, can be used as curing agents for (NCO) functional group containing materials and anhydrides, and are well known in the art. Polyols for use in the powder coating compositions of the present invention are selected such that the resultant material has a high glass transition temperature, i.e., greater than 50° C.

Beta-hydroxyalkylamide materials as crosslinkers for carboxylic acid-functional polymers (a) are disclosed in U.S. Pat. No. 4,801,680, incorporated by reference herein. The hydroxyl functionality of the beta-hydroxyalkylamide should be on an average basis at least two, preferably greater than two, and more preferably from greater than two up to about four in order to obtain optimum curing response.

The beta-hydroxyalkylamide materials can be depicted structurally as follows:

wherein $R_1$ is H or $C_1$-$C_5$ alkyl; $R_2$ is H, $C_1$-$C_5$ alkyl or wherein $R_1$ is as described above; A is a bond, monovalent or polyvalent organic radical derived from a saturated, unsaturated or aromatic hydrocarbon including substituted hydrocarbon radicals containing from 2 to 20 carbon atoms, m is equal to 1 to 2, n is equal to 0 or 2, and m+n is at least 2, preferably greater than 2, usually within the range of from 2 up to and including 4. Preferably, A is an alkylene radical —(CH$_2$)$_x$— where x is from 2 to 12, preferably from 4 to 10. A preferred beta-hydroxyalkylamide is N,N,N',N'-tetrakis(2-hydroxyethyl)adipamide commercially available from Ems-Chemie AG, Switzerland under the trade name PRIMID XL-552.

The beta-hydroxyalkylamide can be prepared by reacting a lower alkyl ester or mixture of esters of carboxylic acids with a beta-hydroxyalkylamine at a temperature ranging from ambient temperature up to about 200° C., depending on the choice of reactants and the presence or absence of a catalyst. Suitable catalysts include base catalysts such as sodium methoxide, potassium methoxide, sodium butoxide, potassium butoxide, sodium hydroxide, potassium hydroxide and the like, present in amounts of about 0.1 to about 1 percent by weight based on the weight of the alkyl ester.

To bring about the most effective cure of the powder coating composition, the equivalent ratio of beta-hydroxyalkylamide (hydroxy equivalents) to carboxy-containing polyester (carboxylic acid equivalents) is preferably from about 0.6 to 1.6:1, more preferably from 0.8 to 1.3:1. Ratios outside the range of 0.6 to 1.6:1 are less desirable because of poor cure.

Anhydrides as curing agents for epoxy functional group containing materials are well known in the art. Examples of such curing agents include trimellitic anhydride, benzophenone tetracarboxylic dianhydride, pyromellitic dianhydride, tetrahydrophthalic anhydride, and the like as described in U.S. Pat. No. 5,472,649 at col. 4, lines 49 to 52, incorporated by reference herein.

Aminoplasts as curing agents for OH, COOH and carbamate functional group containing materials are well known in the art. Examples of such curing agents suitable for use in the present invention are aldehyde condensates of glycoluril, which give high melting crystalline products useful in powder coatings. While the aldehyde used is typically formaldehyde, other aldehydes such as acetaldehyde, crotonaldehyde, and benzaldehyde can be used.

The accent powder basecoating composition comprises at least one reaction product of at least one cyclic carboxylic acid anhydride, at least one alkene and at least one reactant selected from the group consisting of primary amines, aliphatic polyamines, primary amino alcohols, alcohols, isocyanates and mixtures thereof. The copolymer has a number average molecular weight ranging from about 1,000 to about 20,000, preferably about 3,000 to about 10,000, and more preferably about 3,000 to about 6,000, and most preferably about 2,000 to about 2,500.

Non-limiting examples of suitable cyclic carboxylic acid anhydrides include maleic anhydride (preferred), chloromaleic anhydride, dichloromaleic anhydride, bromomaleic anhydride, citraconic anhydride, dimethylmaleic anhydride, ethylmaleic anhydride, itaconic anhydride, vinylsuccinic anhydride and vinyl trimellitate anhydride.

Suitable alkenes include cycloalkenes, alpha, olefins, vinyl monomers, esters of acrylic acid or methadrylic acid, and mixtures thereof.

Examples of suitable alpha olefins include 1-hexene, 1-heptene, 1-octene, 1-nonene, 1-decene (preferred), 2-methyl-1-butene, 2-ethyl-1-butene, 2-ethyl-1-pentene, 2-methyl-1-pentene and 2-ethyl-1-hexene.

The reaction product can be considered an essentially alternating copolymer of the cyclic carboxylic acid anhydride and alkene. Theoretically, one mole of the cyclic carboxylic acid anhydride or substituted cyclic carboxylic acid anhydride is added to one mole of the alkene to obtain the copolymer. However, a molar excess of the alkene over the cyclic carboxylic acid anhydride is preferably employed. The reaction is carried but by heating the reactants together, preferably in the presence of an organic solvent and in the presence of a free radical, initiator, e.g., an organic peroxide such as tertiary amyl peroxyacetate, tetertiaryy butyl perbenzoate and the like, or an azo compound such as azobisisobutyronitrile and the like at a temperature generally up to the reflux of the alkene, generally. temperatures from about 30° C. to about 220° C., preferably from about 80° C. to 180° C. for a time sufficient to complete the copolymerization, generally, a period of time varying between 1 to 24 hours, preferably 1 to 3 hours. The organic peroxide free radical initiators are preferred.

The reaction product generally has a number average molecular weight of from about 1,000 to about 20,000, preferably from about 3,000 to about 10,000, and more preferably from, 3,000 to 6,000. The number average molecular weight of the copolymers can be determined by gel permeation chromatography (GPC) using a polystyrene standard. By such method, it is not the actual molecular weight that is measured but an indication of the molecular weight as compared to polystyrene. The values that are obtained are commonly referred to as polystyrene numbers, however, for the purposes of this application, they are referred to as molecular weights. Molecular weights (number average) less than 1,000 are undesirable as the copolymer loses surface activity, i.e., loss of flow control properties, whereas molecular weights greater than about. 10,000 are less desirable and greater than about 20,000 are undesirable because of detrimental flow properties due to high viscosity.

The reaction product is chemically modified by from about 0.5 to about 100 mole percent of a reactant selected from the group consisting of primary amines, aliphatic polyamines, primary amino alcohols, alcohols, isocyanates and mixtures thereof, based on moles of the anhydride functional groups in the copolymer. Preferably, the reaction product is chemically modified by from about 2 to about 10 mole percent of the reactant discussed above.

Chemical modification with an alcohol forms the partial ester or half ester derivatives, while chemical modification with a primary amine forms the imide. Among the alcohols that can be used are alkanols, preferably alkanols containing from 1to about 10 carbon atoms such as methanol, ethanol, propanols, butanols, pentanols, hexanols, heptanols, octanols and the like. More preferably, the alkanol is methanol, ethanol, butanol, or 2-ethylhexanol. Aryl alkanols, such as benzyl alcohol, phenethyl alcohol and phenyl propyl alcohol, alkyl glycols, such as, ethylene glycol or propylene glycol, and substituted alkyl glycols, such as, the monoethylether of ethylene glycol, monobutylether of ethylene glycol, and monohexylether of ethylene glycol can also be suitable alcohols to form the half esters of the anhydride groups. The alcohols may also be a tertiary amine having at least one alkanol radical such as 2-dimethylaminoethanol, 1-diemthylaminomethylpropanol, 2 diethylaminoethanol and the like, or a diglycol amine, such as dimethyl or diethyl(amino ethoxy) ethanol. Chemical modification, i.e., esterification, by an alcohol can be accomplished by heating the copolymer and the alcohol together at a temperature of 100° C. to 150° C., optionally using a catalyst, such as sodium methoxide, to expedite the anhydride ring opening.

The copolymer can also be chemically modified with primary amines, such as butylamine, isobutylamine, propylamine, isopropylamine, ethylamine, methylamine and pentylamine, aliphatic polyamines, such as N,N-dimethylaminopropylamine, N,N-dimethylaminoethylamine, N,N-diethylaminopropylamine, N,N-diethylaminoethylamine and the like, or primary aminoalcohols such as ethanolamine (preferred) and propanolamine and the like. Primary amines such as aliphatic polyamines, e.g., N,N-dimethylaminopropylamine, yield an imide-modified anhydride with pendent tertiary amino groups, which may act as a catalyst for epoxy reactions, and increase the crosslink density and resistance properties of the cured coating. Primary aminoalcohols can yield an imide-modified anhydride with pendent alcohol functionality.

Examples of suitable isocyanates include alkyl-substituted isocyanates such as MONDUR O octadecyl isocyanate.

Preferably, the reaction product is prepared from 1-decene, maleic anhydride, monoethanol amine and octadecyl isocyanate, has an acid value ranging from about 8 to about 15 and a number average molecular weight ranging from about 2,000 to about 2,500.

Generally, the accent powder basecoating composition comprises from about 50 to about 85 percent by weight of film-forming material and from about 70 to about 80 percent by weight of the reaction product. Preferably, the reaction product will be included in the first powder basecoating composition from about 0.1 to about 5 percent by weight, more preferably, from about 0.5 to about 3 percent by weight on the basis of the total weight of film-forming material and reaction product.

The accent powder basecoating composition comprises at least one flow control agent. Suitable as flow control agents are acrylic polymers (preferred), such as polylauryl acrylate polybutyl acrylate, poly(2-ethylhexyl)acrylate, poly(ethyl-2-ethylhexyl)acrylate, polylauryl methacrylate, polyisodecyl methacrylate and the like, and fluorinated polymers such as esters of polyethylene glycol or polypropylene glycol with fluorinated fatty acids, e.g., an ester of polyethylene glycol having a molecular weight over about 2,500 and perfluorooctanoic acid. Polymeric siloxanes with molecular weights over 1,000 may also be used as a flow control agent, for example, polydimethylsiloxane or poly(methylphenyl)siloxane. The flow control agents can aid in reduction of surface tension during heating of the powder and in eliminating crater formation. Preferably, the flow control agent is an acrylic copolymer prepared from 2-ethylhexyl acrylate and butyl acrylate, such as RESIFLOW PL200 available from Estron Chemical of Calvert City, Ky. Generally, the flow control agent is present in amounts from about 0.05 to about 5 percent by weight based on the total weight of the first powder coating composition.

The accent powder basecoating composition can comprise one or more visual effect additives. Examples of suitable visual effect additives include flake or plate pigments or metallized polymeric particles. Examples of flake pigments include aluminum flake pigments such as Silberline TF4700/LE10521, aluminum flake. Other metal platelet or flake compositions may be used such as bronze flake, stainless steel flake, nickel flake, tin flake, silver flake, copper flake and the like. Preferred flake pigments range from 1.0 to 50.0 micron in size. In addition to the flake pigments described, other metallized polymeric particles, such as aluminized Mylar and aluminized polyester fibers may be used. Other suitable pigments include micas, coated micas, iron oxides, lead oxides, carbon black, titanium dioxide and colored organic pigments such as phthalocyanines. Suitable metal oxides used as coatings on mica particles can comprise aluminum oxides or other metal oxides such as titanium dioxide, ferric oxide, chromium hydroxide, and the like and combinations thereof. Other useful pigments include HELICONE HC silicone liquid crystal platelets.

The specific pigment to binder ratio can vary widely so long as it provides the requisite hiding at the desired film thickness and application solids. The pigment is incorporated into the powder coating at a level of 0.1% to 20.0% based on the total weight of the powder coating. Preferably, the amount of flake pigment is between 1.0% and. 10.0% based on total weight of the coating composition.

In order for the attractive visual effects caused by the orientation of the flake pigment in the resultant coating to be realized, the flake pigment particles are incorporated into the second powder coating composition by dry blending rather than extrusion. The dry blending operation can be conducted with cooling or with heating. Dry blending with heat is referred to as "bonding". The bonding method is believed to attach the flake pigment to the binder particles, but not to actually disperse the flake pigment in the binder powder particles. The "bonding" method of dispersion is particularly useful in the dispersion of metal flake particles since it eliminates the undesirable electrostatic effects that occur in the electrostatic spraying of metallic particles.

One or more non-flake pigments can be included in the coating composition typically in amounts from about 1 to about 50 percent by weight, based on the total weight of the powder basecoating composition. Pigments which are suitable for powder coating compositions may be organic or inorganic and include basic lead silica chromate, titanium dioxide, ultramarine blue, phthalocyanine blue, phthalocyanine green, carbon black, black iron oxide, chromium green oxide, ferrite yellow and quint red. Platelet or flake pigments (discussed below) can be included in the powder basecoating composition, if desired.

Anti-popping agents can be added to the compositions to allow any volatile material present to escape from the film during baking. Benzoin and/or zinc oxide are preferred degassing agents and when used is present amounts ranging from about 0.5 to about 3 percent by weight based on total weight of the powder basecoating composition. The powder coating compositions may also preferably contain UV absorbing agents, such as TINUVIN, which when used are typically present in the compositions in amounts of about 0.5 to about 6 percent by weight based on the total weight of the first powder basecoating composition.

In addition, the accent powder basecoating composition may contain fumed silica or the like as a powder flow additive to reduce caking of the powder during storage. An example of fumed silica is sold by Cabot Corporation under the trademark CAB-O-SIL RTM. The powder flow additive, when used, is generally present in amounts ranging from about 0.1 to about 0.5 percent by weight based on the total weight of the first powder basecoating composition. The powder flow additive is generally added to the particulate powder basecoating composition after preparation of the particulate mixture.

Powder coating compositions are typically prepared by blending the polymers containing the functional groups, crosslinking agents (for thermosetting compositions) and optional ingredients for 15 minutes in a Henschel blade blender. The powder is then usually extruded such as through a Baker-Perkins twin-screw extruder. The extrudate is particulized typically by first chipping into flake and then milling in a hammer mill. The finished powder can be then classified to a particle size of usually between 20 and 30 micrometers in a cyclone grinder/sifter.

An example of a suitable powder basecoat is ENVIRO-CRON PZB75100 silver metallic powder base coat available from PPG Industries, Inc.

The powder coating can be applied by electrostatic spraying or by the use of a fluidized bed. Electrostatic spraying using a gun or bell at 55 to 80 kV, 80 to 120 grams or more per minute is preferred. The powder basecoating composition can be applied in one pass or in several passes to provide a film thickness after cure of about 12.7 to about 102 micrometers (about 0.5 to about 4 mils). Preferred coating thickness is such that good chip resistance, U.V. opacity, and visual hiding are realized. Preferred film thickness is about 12 to about 50 micrometers (about 0.5 to about 2 mils). An advantage of the process of the present invention is that a thinner layer of accent basecoating can be used as compared to a conventional solvent borne accent basecoating, while still providing acceptable chip resistance. In one embodiment, a wedge film build can be used on the lower half panel ranged from 50 micrometers (2.0 mils) dropping down to 12 micrometers. (0.5 mils) at the bottom of the panel. The substrate to be coated can optionally be preheated prior to application of the powder to promote a more uniform powder deposition.

Preferably, the powder primer (if present) and accent base coat are heated to a temperature sufficient and for a period of time sufficient to cure prior to application of the main basecoating composition. The accent base coat is heated at a temperature of about 160° C. to about 190° C. for a period of about 10 to about 45 minutes, preferably about 170° C. to about 175° C. for a period of about 20 to about 30 minutes.

As used herein, the term "cure" as used in connection with a composition, e.g., "composition when cured," and "thermoset" as used in connection with a composition, e.g. "thermoset composition" shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full cross linking. One skilled in the art will understand that the presence and degree of crosslinking, i.e., the crosslink density, can be determined by a variety of methods, such as dynamic mechanical thermal analysis (DMTA) using a TA Instruments DMA 2980 DMTA analyzer conducted under nitrogen. This method determines the glass transition temperature and crosslink density of free films of coatings or polymers. These physical properties of a cured material are related to the structure of the crosslinked network.

After curing and cooling, a masking coating is applied over the accent base coat to shield the accent base coat from overspray during application of the main basecoat. Suitable masking agents are well known to those skilled in the art. Examples of suitable masking agents include HiTemp polypropylene masking paper available from Kwik Paint Products and tape available from American Tape Corp.

After masking of the accent base coat, a main basecoating is applied to a second predetermined portion of the substrate adjacent to the first predetermined portion of the substrate, i.e., to the unmasked areas of the substrate. The main basecoating can be liquid or powder. As used herein "powder" includes both dry powder and powders that are slurried in a solution, such as water. Preferably the powder basecoating composition is a dry powder.

Suitable powder basecoating compositions comprise polymer(s) having reactive functional groups, curing agent(s), reaction products, flow control agents, pigments and other additives as discussed above. Preferably, the main basecoating composition comprises at least one thermosettable polyester having reactive functional groups, one or more curing agents selected to react with the functional groups of the thermosettable polyester, reaction product and flow control agent as discussed above. In one embodiment, the main powder basecoating composition can comprise the same binder components and additives as in the accent powder basecoating composition.

Suitable liquid basecoating compositions comprise a film-forming material or binder, volatile material and optionally pigment. Preferably, the basecoating composition is a crosslinkable coating composition comprising at least one thermosettable film-forming material, such as acrylics, polyesters (including alkyds), polyurethanes and epoxies, and at least one crosslinking material such as are discussed above. Thermoplastic film-forming materials such as polyolefins also can be used. The amount of film-forming material in the liquid basecoat generally ranges from about 40 to about 97 weight percent on a basis of total solids of the basecoating composition. The amount of crosslinking material in the basecoat coating composition generally ranges from about 5 to about 50 weight percent on a basis of total resin solids weight of the basecoat coating composition.

Suitable acrylic film-forming polymers include copolymers of one or more of acrylic acid, methacrylic acid and alkyl esters thereof, such as methyl methacrylate, ethyl methacrylate, hydroxyethyl methacrylate, butyl methacrylate, ethyl acrylate, hydroxyethyl acrylate, butyl acrylate and 2-ethylhexyl acrylate, optionally together with one or more other polymerizable ethylenically unsaturated monomers including vinyl aromatic compounds such as styrene and vinyl toluene, nitriles such as acrylontrile and methacrylonitrile, vinyl and vinylidene halides, and vinyl esters such as vinyl acetate. Other suitable acrylics and methods for preparing the same are disclosed in U.S. Pat. No. 5,196,485 at column 11, lines 16-60, which are incorporated herein by reference.

Polyesters and alkyds are other examples of resinous binders useful for preparing the basecoating composition. Such polymers can be prepared in a known manner by condensation of polyhydric alcohols, such as ethylene glycol, propylene glycol, butylene glycol, 1,6-hex ylene glycol, neopentyl glycol, trimethylolpropane and pentaerythritol, with polycarboxylic acids such as adipic acid, maleic acid, fumaric acid, phthalic acids, trimellitic acid or drying oil fatty acids.

Polyurethanes also can be used as the resinous binder of the liquid basecoat. Useful polyurethanes include the reaction products of polymeric polyols such as polyester polyols or acrylic polyols with a polyisocyanate, including aromatic diisocyanates such as 4,4'-diphenylmethane diisocyanate, aliphatic diisocyanates such as 1,6-hexamethylene diisocyanate, and cycloaliphatic diisocyanates such as isophorone diisocyanate and 4,4'-methylene-bis(cyclohexyl isocyanate).

The liquid basecoating composition comprises one or more volatile materials such as water, organic solvents and/or amines. The solids content of the liquid basecoating composition generally ranges from about 15 to about 60 weight percent, and preferably about 20 to about 50 weight percent.

The basecoating composition can further comprise one or more additives such as pigments, fillers, UV absorbers, rheology control agents or surfactants.

Suitable waterborne basecoats for color-plus-clear composites include those disclosed in U.S. Pat. Nos. 4,403,003, 5,401,790 and 5,071,904, which are incorporated by reference herein. Also, waterborne polyurethanes such as those prepared in accordance with U.S. Pat. No. 4,147,679 can be used as the resinous film former in the basecoat, which is incorporated by reference herein. Suitable film formers for organic solvent-based base coats are disclosed in U.S. Pat. No. 4,220,679 at column 2, line 24 through column 4, line 40 and U.S. Pat. No. 5,196,485 at column 11, line 7 through column 13, line 22, which are incorporated by reference herein. Other useful solvent borne basecoats include acrylic/melamine basecoats such as the NHU series of basecoats available from PPG Industries, Inc.

The liquid basecoating can be applied to the surface of the substrate by any suitable coating process well known to those skilled in the art, for example by dip coating, direct roll coating, reverse roll coating, curtain coating, spray coating, brush coating and combinations thereof. The thickness of the basecoating composition applied to the substrate can vary based upon such factors as the type of substrate and intended use of the substrate, i.e., the environment in which the substrate is to be placed and the nature of the contacting materials. Generally, the thickness of the basecoating composition applied to the substrate ranges from about 10 to about 38 micrometers, and more preferably about 12 to about 30 micrometers.

The main basecoating composition differs from the accent basecoating composition in that the cured basecoat, after topcoat is applied and cured, provides the second predetermined portion of the substrate with a different color or visual effect from the first predetermined portion of the substrate coated with the accent coating, i.e., a two-tone effect. For example, the accent portion can be black and the main portion can be red. Alternatively, the main basecoat can comprise one or more visual effect additives that are different from those (if any) used in the accent powder basecoating composition, i.e., the amount of visual effect additive or type of visual effect additive in the main basecoating composition is different from that of the accent basecoating composition or the main basecoating composition comprises one or more visual effect additives and the accent base coating composition is free of visual effect additive.

After application of the main powder basecoating, the masking is removed from the accent coating. Suitable, methods for removing masking are well known to those skilled in the art, for example pulling the tape to separate it from the coated surface of the substrate.

A topcoat is deposited over the accent and main basecoats and cured to provide the two-tone composite coated substrate of the present invention. The topcoat can be liquid, powder slurry (powder suspended in a liquid) or powder, as desired. Preferably, the topcoating composition is a crosslinkable coating comprising one or more thermosettable film-forming materials and one or more crosslinking materials such as are discussed above. Useful film-forming materials include epoxy-functional film-forming materials, acrylics, polyesters and/or polyurethanes. The topcoating composition can include additives such as are discussed above for the basecoat, but preferably not pigments. If the topcoating is a liquid or powder slurry, volatile material(s) are included. Suitable waterborne topcoats are disclosed in U.S. Pat. No. 5,098,947 (incorporated by reference herein) and are based on water soluble acrylic resins. Useful solvent borne topcoats are disclosed in U.S. Pat. Nos. 5,196,485 and 5,814,410 (incorporated by reference herein) and include epoxy-functional materials and polyacid curing agents. An example of a useful solvent borne topcoats is SRC8002 solvent borne clearcoating composition available from PPG Industries, Inc. Suitable powder slurry topcoating compositions include those disclosed in International Publications WO 96/32452 and 96/37561, European Patents 652264 and 714958, and Canadian Pat. No. 2,163,831, which are incorporated by reference herein. Suitable powder topcoats are described in U.S. Pat. Nos. 5,407,707 and 5,663,240 (incorporated by reference herein) and include epoxy functional acrylic copolymers and polycarboxylic acid crosslinking agents. The powder topcoat can be applied by electrostatic spraying using a gun or bell at 55 to 80 kV, 80 to 120 grams per minute to achieve a film thickness of about 50-90 microns, for example.

The amount of the topcoating composition applied to the substrate can vary based upon such factors as the type of substrate and intended use of the substrate, i.e., the environment in which the substrate is to be placed and the nature of the contacting materials. Generally, the topcoating composition, is applied to provide a film thickness after cure of about 12.7 to about 102 micrometers. (0.5 to about 4 mils), preferably about 38.1 to about 68.6 micrometers (1.5 to about 2.7 mils). Typically, the composite coating is then heated to a temperature between about 110° C. and about 190° C. (preferably between about 150° C. and about 190° C.) for a period of about 4 to about 40 minutes.

The coated substrate is then heated to a temperature sufficient to melt, coalesce and then cure the coating. This is an important step in the present invention because when done correctly the flake pigment migrates to the air interface and aligns itself in a substantially parallel direction to the substrate, resulting in a distinctive, visually pleasing appearance. The heating step should be conducted such that the powder basecoating coalesces to a substantially continuous fluid layer, but not so high as to cause viscosity increase and crosslinking of the coating before any flake pigment present aligns with the coating surface. The layer is maintained in the fluid state for a period of time sufficient for the flake pigment to rise to to align so that the two largest dimensions of the pigment flake are almost parallel with the coating surface. After the pigment has aligned itself with the coating surface, the coating may continue to be heated until, in the case of thermoset powder basecoats, partial or complete cure is accomplished. Typically, the color coat is heated to a temperature between about 100° C. and about 119° C. (preferably between about 110° C. and about 170° C.) for a period of about 4 to about 40 minutes.

The thickness of the sintered and crosslinked composite coating is generally about 0.2 to about 5 mils (5 to 125 micrometers), and preferably about 0.4 to about 4 mils. (10 to 100 micrometers). The composite coating is cured such that any crosslinkable components of the coating are crosslinked to such a degree that the automobile industry accepts the coating process as sufficiently complete to transport the coated automobile body without damage to the coating.

Illustrating the invention are the following examples which, however, are not to be considered as limiting the invention to their details. Unless otherwise indicated, all parts and percentages in the following examples, as well as throughout the specification, are by weight.

EXAMPLES

The following Example A shows the preparation of a coated panel by the process of the present invention using a cleaned and pretreated galvanized substrate coated with an electrodeposited primer, powder primer, powder color coat and liquid clearcoat, respectively. For the purpose of comparison, the Control panel was coated by a conventional method using the same electrodeposited primer, and conventional liquid color coat and liquid clearcoat. The results of physical property testing of the coated panels are shown in Table 1 below.

Preparation of Electrodeposition Panels

PPG ED6100H primer was applied by electrodeposition to cleaned and pretreated GALVANEAL panels and baked for 20 minutes at 177° C. (350° F.) to provide a film thickness of 20 to 30 micrometers (0.8 to 1.2 mils).

Example A

Preparation of Powder Primer/Powder Base Coat/Liquid Clear Coat Two-Tone Effect Panels In this Example, ENVIROCRON PCV70118 powder primer (available from PPG Industries, Inc.) was applied to the top half of the above panels by electrostatic spray and feathered in film build on the lower half. Target film build on the top half of the panel was 50 to 70 micrometers (2.0 to 2.8 mils). Wedge film build on the lower half panel ranged from 50 micrometers (2.0 mils) dropping down to 12 micrometers (0.5 mils) at the bottom of the panel.

ENVIROCRON PZB75100 silver metallic powder base coat (available from PPG Industries, Inc.) containing aluminum flake pigment was applied to the lower half of the above panels by electrostatic spray to provide a basecoat film thickness of 43 to 70 micrometers (1.7 to 2.8 mils), slightly overlapping the powder primed area of the middle of the panel.

The ENVIROCRON PZB75100 powder base coat included carboxylic acid functional polyester resin, beta hydroxy alkylamide crosslinker, acrylate copolymer, reaction product as described below, degassing agents, antioxidant, UV absorber and pigments.

The reaction product was prepared by the following method. A reaction vessel fitted with a condenser, thermometer, nitrogen sparging inlet and agitator was charged with 61.1 parts by weight (ppw) of 1-decene dissolved in 73.8 ppw of butyl acetate. The 1-decene solution was heated to a reflux temperature at 145° C. and a mixture of 1.8 ppw of tertiary-amyl peroxyacetate (60% by weight in mineral spirits) available as LUPERSOL 555-M60 and 62.7 ppw of butyl acetate was added over a period of about three hours. A solution of 27.4 ppw of maleic anhydride in 98.8 ppw of butyl acetate was added over a period of about two hours. The reaction mixture was thinned with an additional 85.5 ppw of butyl acetate followed by heating at reflux for one hour. Monoethanolamine (16.2 ppw) and 16.2 ppw of butyl acetate were added to the reaction mixture and the reaction mixture heated to reflux and water removed by azeotropic distillation when the water content of the reaction mixture was reduced to less than 0.2% by weight. The temperature of the reaction mixture was set to 115° C. and 1.6 ppw of octadecyl isocyanate dissolved in 30.0 ppw of butyl acetate was added to the reaction mixture. The reaction mixture was maintained at 115° C. until there was no evidence of NCO by IR analysis. Thereafter, solvent was removed by distillation until the reaction mixture reached a solids content of 65% by weight.

After application of the powder basecoat as described above, the panels were baked for 30 minutes at 172° C. (340° F.) in an electric box oven and allowed to air cool to ambient temperature (about 25° C.) to provide a total film thickness at the lower half of the panels of 55 to 120 micrometers (2.2 to 4.8 mils), i.e., in the two-tone basecoat area to provide an accent color to the lower portion of the panel.

The bottom section of the above panel was masked with a conventional masking agent (HiTemp polypropylene masking available from Kwik Paint Products and tape available from American Tape. Corp) to prevent coating by the liquid base coat to be applied to the upper portion of the panel.

The upper section of the panels were coated with PPG NHU9517 acrylic/melamine solvent borne basecoat (available from PPG Industries, Inc.) and baked for 10 minutes at 121° C. (250° F.) in an electric box oven and allowed to air cool to give a film thickness of 20 to 38 micrometers (0.8 to 1.5 mils).

The mask over the bottom powder base coated section was then manually removed to permit liquid clear coating.

PPG SRC8002 solvent borne clearcoating composition (available from PPG Industries, Inc.) was then applied to the entire panel (over both the lower powder and upper liquid basecoats) by spray application and was baked for 30 minutes at 141° C. (285° F.) to give a film thickness of 38 to 64 micrometers (1.5 to 2.6 mils).

Control (Comparative)

Preparation of Control Two-Tone Panels Coated with Conventional Liquid System

ENVIROCRON PCV70118 powder primer (available from PPG Industries, Inc.) was applied to the electrodeposited panels by electrostatic spray and baked for 30 minutes at 172° C. (340° F.) in an electric box oven and allowed to air cool to give a film thickness of 50 to 70 micrometers (2.0 to 2.8 mils).

Liquid solvent-borne NHU38602 acrylic/melamine solvent borne basecoat containing aluminum flake pigment (available from PPG Industries, Inc.) was applied to the lower half of the powder primed panels above by spray application and the panels were baked for 10 minutes at 121° C. (250° F.) in an electric box oven and allowed to air cool to give a film thickness of 20 to 38 micrometers (0.8 to 1.5 mils).

PPG SRC8002 solvent borne clear coating composition (available from PPG Industries, Inc.) was then applied to the liquid basecoated portion of the panel by spray application and was baked for 30 minutes at 141° C. (285° F.) to give a film thickness of 38 to 64 micrometers (1.5 to 2.6 mils).

The bottom section of the above panel coated with the accent topcoat is masked off to prevent coating by the liquid base coat to be applied to the upper portion of the panel.

The upper section of the panel was coated with PPG NHU9517 acrylic/melamine solvent borne basecoat (available from PPG Industries, Inc.) and baked for 10 minutes at 121° C. (250° F.) in an electric box oven and allowed to air cool to give a film of 20 to 38 micrometers (0.8 to. 1.5 mils).

PPG SRC8002 solvent borne clear composition was then applied to the upper section of the panel by spray application as above. The masking over the bottom section of the panel was removed and the panel was baked for 30 minutes at 141° C. (285° F.) to give a clear coat film thickness on the upper section of the panel of 38 to 64 micrometers (1.5 to 2.6 mils).

Comparison of Panels

The following Table 1 shows a direct comparison of panels prepared by the process of the present invention (Example A) and panels coated by a conventional process (Control). The panels prepared by the process of the present invention are generally equal to those of the control with respect to the following automotive test properties: 20° gloss (ASTM D523-89), chip resistance (ASTM 3170-03), scratch resistance (Chrysler Test LP463-PB-54-01 crock-mar test: 20° gloss retention), Dry cross-hatch adhesion (ASTM D3359 Method A), humidity resistance (ASTM D1735-02 for 240 hrs at 100° F. and 100% relative humidity) durability (24 months Florida Exposure, SAE J1976) and salt spray corrosion resistance (ASTM B117-95).

TABLE 1

|  | Example A | Control |
| --- | --- | --- |
| 20° Gloss ASTM D523-89 | 80-95 | 80-95 |
| Chip Resistance | 7-8 | 6-7 |

TABLE 1-continued

|  | Example A | Control |
| --- | --- | --- |
| ASTM 3170-03 (Scale: 1 = poor/10 = excellent) Scratch Resistance Chrysler Test LP-463-PB-54-01 (crock-mar test: 20° gloss retention) | 60-70% | 60-70% |
| Adhesion ASTM D3359 Method A Dry crosshatch adhesion | 100% | 100% |
| Humidity resistance ASTM D1735-02 (240 hrs 100° F. 100% relative humidity) Durability (24 months Florida Exposure) SAE J1976 | 100% Adhesion No Blisters No Blush No Cracking | 100% Adhesion No Blisters No Blush No Cracking |
| % 20° gloss Retention | 80-88 | 80-88 |
| Blister/Blush | None/None | None/None |
| Acid Etch Corrosion Resistance: ASTM B117-95 Salt Spray 500 hrs Salt Spray | Slight-Moderate | V. Slight-Slight |
| Scribe Creep (mm) | 2-6 mm | 2-6 mm |
| Blister Size/Density | Very Small/ Very Few | Very Small/ Very Few |

The above comparative examples show that the coating system of Example A of the present invention compares very favorably with the conventional, coating system. The coating system of the present invention allows for the elimination of the entire separate two-tone color booth and oven, which provides greater flexibility than the conventional coating process, particularly with regards to capability, efficiency and cost.

It will be appreciated by those skilled in the art that changes could be made to the embodiments described above without departing from the broad inventive concept thereof. It is understood, therefore, that this invention is not limited to the particular embodiments disclosed, but it is intended to cover modifications that are within the spirit and scope of the invention, as defined by the appended claims.

Therefore, we claim:

1. A process for applying a two-tone color effect coating to a substrate, comprising the steps of:

(a) applying an accent powder basecoating composition to a first predetermined portion of a surface of a substrate to form an accent powder basecoating, the accent powder basecoating composition comprising at least one film-forming material and a first color effect additive;

(b) at least partially curing the accent powder basecoating to form an accent basecoat;

(c) applying a main liquid or powder basecoating composition to a second predetermined portion of the surface of the substrate, such that a portion of the accent basecoat is not contacted by the main basecoating composition, wherein the main powder basecoating composition comprises at least one film-forming material and a second color effect additive that is different from the first color effect additive of the accent powder basecoating composition;

(d) at least partially curing the main basecoating composition to form a main basecoat;

(e) applying a topcoating composition over the accent basecoat and main basecoat; and (f) curing the topcoating composition and any uncured basecoat, such that the first predetermined portion of the surface of the substrate has a different color effect than, the second predetermined portion of the surface of the substrate to provide a two-tone color effect coated substrate.

2. The process according to claim 1, wherein the film-forming material of the accent powder basecoating composition and the film-forming material of the main powder basecoating composition are each independently selected and each comprise at least one thermosettable film-forming material and at least one curing agent.

3. The process according to claim 2, wherein the thermosettable film-forming material is selected from the group consisting of acrylics, polyesters, polyurethanes, epoxies and mixtures thereof.

4. The process according to claim 2, wherein the thermosettable film-forming material is a polymer having reactive functional groups selected from the group consisting of hydroxyl, carboxylic acid, epoxy, carbamate, amide, carboxylate and combinations thereof.

5. The process according to claim 2, wherein the thermosettable film-forming material is a polyester having carboxylic acid functionality.

6. The process according to claim 2, wherein the curing agent is selected from the group consisting of aminoplasts, blocked polyisocyanates, polyacids, polyepoxides, polyols, polyanhydrides, hydroxyalkylamides, and mixtures thereof.

7. The process according to claim 2, wherein the thermosettable film-forming material is a polyester having carboxylic acid functionality and the curing agent is a hydroxyalkylamide.

8. The process according to claim 1, wherein the accent powder basecoating composition further comprises: at least one reaction product of at least one cyclic carboxylic acid anhydride, at least one alkene and at least one reactant selected from the group consisting of primary amines, aliphatic polyamines, primary amino alcohols, alcohols, isocyanates and combinations thereof, the copolymer having a number average molecular weight ranging from about 1,000 to about 20,000.

9. The process according to claim 8, wherein the cyclic carboxylic acid anhydride is selected from the group consisting of maleic anhydride, itaconic anhydride, citraconic anhydride, vinylsuccinic anhydride and vinyl trimellitate anhydride.

10. The process according to claim 8, wherein the alkene is selected from the group consisting of cycloalkenes, alpha olefins, vinyl monomers, esters of acrylic acid or methacrylic acid, and mixtures thereof.

11. The process according to claim 10, wherein the alkene is an alpha olefin selected from the group consisting of 1-hexane, 1-heptene, 1-octene, 1-nonene and 1-decene.

12. The process according to claim 8, wherein the reactant is a primary amine selected from the group consisting of methylamine, ethylamine, propylamine, isopropylamine, butylamine, isobutylamine and pentylamine.

13. The process according to claim 8, wherein the reactant is an aliphatic polyamine selected from the group consisting of N,N-dimethylaminopropylamine, N,N-dimethylaminoethylamine, N,N-diethylaminopropylamine and N,N-diethylaminoethylamine.

14. The process according to claim 8, wherein the. reactant is a primary amino alcohol selected from the group consisting of ethanolamine and propanolamine.

15. The process according to claim 8, wherein the reactant is an alcohol selected from the group consisting of alkanols, aryl alkanols and alkyl glycols.

16. The process according to claim 8, wherein the accent powder basecoating composition further comprises at least one flow control agent.

17. The process according to claim 1, wherein the main basecoating composition is a powder basecoating composition comprising:
(a) at least one film-forming material;
(b) at least one reaction product of at least one cyclic carboxylic acid anhydride, at least one alkene and at least one reactant selected from the group consisting of primary amines, aliphatic polyamines, primary amino alcohols, alcohols, isocyanates and combinations thereof, the copolymer having a number average molecular weight ranging from about 1,000 to about 20,000; and
(c) a flow control agent.

18. The process according to claim 1, wherein the visual effect additive is selected from the group consisting of flake or plate pigments and metallized polymeric particles.

19. The process according to claim 18, wherein the flake pigment is aluminum coated mica or metal oxide coated mica.

20. The process according to claim 1, wherein the topcoating composition is a powder coating composition comprising an epoxy functional acrylic resin and a polyacid curing agent.

21. A process for applying an effect coating to a substrate, comprising the steps of:
(a) providing a substrate wherein at least a portion of a surface of the substrate is coated with a powder primer coating;
(b) applying an accent powder basecoating composition to a first predetermined portion of the surface of the substrate to form an accent powder basecoating, the accent powder basecoating composition comprising at least one film-forming material and a first color effect additive; and
(c) at least partially curing the powder primer coating and the accent powder basecoating to form an accent basecoat.

22. The process according to claim 21, further comprising the steps of:
(d) applying a main liquid or powder basecoating composition to a second predetermined portion of the surface of the substrate, such that a portion of the accent basecoat is not contacted by the main basecoating composition, wherein the main powder basecoating composition comprises at least one film-forming material and a second color effect additive that is different from the first color effect additive of the accent powder basecoating composition;
(e) at least partially curing the main basecoating composition to form a main basecoat;
(f) applying a topcoating composition over the accent basecoat and main basecoat; and
(g) curing the topcoating composition and any uncured basecoat, such that the first predetermined portion of the surface of the substrate has a different color effect than the second predetermined portion of the surface of the substrate to provide a two-tone color effect coated substrate.

* * * * *